(12) United States Patent
Kao et al.

(10) Patent No.: US 6,588,139 B2
(45) Date of Patent: Jul. 8, 2003

(54) GRAVITATIONAL ANIMAL TRAP

(76) Inventors: Huan Fu Kao, No. 217, Cheng Kung Rd., Area 5, Hsin Shih Village, Hu Kou Country, Hsin Chu Hsien (TW); Shu Hsin Kao, No. 217, Cheng Kung Rd., Area 5, Hsin Shih Village, HuKou Country, Hsin Chu Hsien (TW); Shu Yin Kao, No. 217, Cheng Kung Rd., Area 5, Hsin Shih Village, Hu Kou Country, Hsin Chu Hsien (TW); Shu Lin Kao, No. 217, Cheng Kung Rd., Area 5, Hsin Shih Village, Hu Kou Country, Hsin Chu Hsien (TW)

(*) Notice: Subject to any disclaimer, the term of this patent is extended or adjusted under 35 U.S.C. 154(b) by 0 days.

(21) Appl. No.: 10/035,170

(22) Filed: Jan. 4, 2002

(65) Prior Publication Data

US 2003/0019148 A1 Jan. 30, 2003

(30) Foreign Application Priority Data

Jul. 27, 2001 (TW) .................................. 90118473 A (51) Int. Cl.⁷ ........................ A01M 23/18; A01M 23/20
(52) U.S. Cl. ............................................ 43/61
(58) Field of Search ................................ 43/61, 60, 58

(56) References Cited

U.S. PATENT DOCUMENTS

| | | | | | |
|---|---|---|---|---|---|
| 383,972 A | * | 6/1888 | Mittler | ........................ | 43/61 |
| 1,052,320 A | * | 2/1913 | Crain | ........................ | 43/61 |
| 1,216,918 A | * | 2/1917 | Armbruster | ........................ | 43/61 |
| 1,382,416 A | * | 6/1921 | Dresser | ........................ | 43/61 |
| 1,410,738 A | * | 3/1922 | Dorseth | ........................ | 43/61 |
| 1,423,715 A | * | 7/1922 | Hedberg | ........................ | 43/61 |
| 1,444,934 A | * | 2/1923 | Miller | ........................ | 43/61 |
| 1,515,083 A | * | 11/1924 | Wilkins | ........................ | 43/61 |
| 1,741,429 A | * | 12/1929 | Orgill | ........................ | 43/61 |
| 1,797,784 A | * | 3/1931 | Miller | ........................ | 43/61 |
| 2,129,594 A | * | 9/1938 | Shimamoto | ........................ | 43/61 |
| 2,188,652 A | * | 1/1940 | Cress | ........................ | 43/61 |
| 2,485,319 A | * | 10/1949 | Rosen | ........................ | 43/61 |
| 2,540,418 A | * | 2/1951 | Bird | ........................ | 43/61 |
| 2,562,809 A | * | 7/1951 | Mogren | ........................ | 43/61 |
| 2,574,780 A | * | 11/1951 | Glacoletto | ........................ | 43/61 |
| 2,589,002 A | * | 3/1952 | Vonada | ........................ | 43/61 |
| 3,426,470 A | * | 2/1969 | Rudolph | ........................ | 43/61 |
| 3,823,504 A | * | 7/1974 | Dosch | ........................ | 43/61 |
| 4,162,588 A | * | 7/1979 | Wyant | ........................ | 43/61 |
| 4,546,568 A | * | 10/1985 | Seyler | ........................ | 43/61 |
| 6,164,008 A | * | 12/2000 | Kelley | ........................ | 43/61 |
| 6,484,436 B1 | * | 11/2002 | Chang | ........................ | 43/61 |
| 6,484,672 B1 | * | 11/2002 | Versaw | ........................ | 43/61 |

FOREIGN PATENT DOCUMENTS

| | | | | | |
|---|---|---|---|---|---|
| DE | 2712710 B1 | * | 9/1978 | | |
| FR | 2795915 B1 | * | 1/2001 | | |
| GB | 18679 B1 | * | 8/1911 | ........................ | 43/61 |
| GB | 2216764 B1 | * | 10/1989 | | |
| GB | 2258381 B1 | * | 2/1993 | ........................ | 43/61 |
| JP | 2001-275545 B1 | * | 10/2001 | | |
| WO | WO-95/06406 B1 | * | 3/1995 | | |
| WO | WO-01/65932 B1 | * | 9/2001 | | |

* cited by examiner

Primary Examiner—Darren W. Ark
(74) Attorney, Agent, or Firm—Bacon & Thomas, PLLC (57) ABSTRACT

A gravitational animal trap. The trap includes a trap cage having a movable door, an unturned plate that can be adjusted in terms of different fulcrums thereof, and a sensing device that is pivotally jointed with the upturned plate to activate the door switch. When the prey enters the trap cage and steps on the upturned plate, causing the upturned plate to alter the state of equilibrium due to the gravitational force of the prey, the sensing device is activated to shut the movable door, thus achieving the object of entrapping the prey. A weight-adjusting balance device can be further installed with the present invention to effectively improve upon the sensitivity and timing for the shutting of the movable door of the gravitational animal trap.

1 Claim, 10 Drawing Sheets

GRAVITATIONAL ANIMAL TRAP

BACKGROUND OF THE INVENTION

1. Field of the Invention

The present invention relates to a gravitational animal trap, more particularly, a gravitational animal trap with an upturned plate in the interior having a fulcrum thereof being able to be adjusted, and a weight-adjusting balancing device can be further installed with the present invention, so as to effectively improve upon the sensitivity and timing for the shutting of the movable door of the gravitational animal trap.

2. Description of the Related Art

Ever since agricultural activities began to occupy a significant portion of the human history, farmers have been bothered and suffered from crop losses by all kinds of noxious insects and small animals. For insect attack, numerous kinds of pesticides are already developed and put to use; and yet for small animals, like rodents, there is still no effective solution to exterminate. As for nowadays city dwellers and suburban homeowners, small animals like rats are still causing tremendous distress and agony, not only for material losses, but also for potentially serious health hazard spread by those small animals through viruses or bacteria.

The conventional art has already provided the invention of animal traps; however, the conventional animal trap employs the design of placing the bait on a hook to lure the prey, yet while the prey is lured into the animal trap, the trap door cannot be immediately shut until the prey bites the bait and pulls the hook, a gravitational force placed on the hook that activates the door to be shut, therefore achieving the object of entrapping the prey. As a result, the low sensitivity of the door in the conventional art would render such animal trap ineffective, for the prey after entering the trap cage might not pull the hook or the prey might just eat a small portion of the bait and escape from the trap cage.

Figure 1:
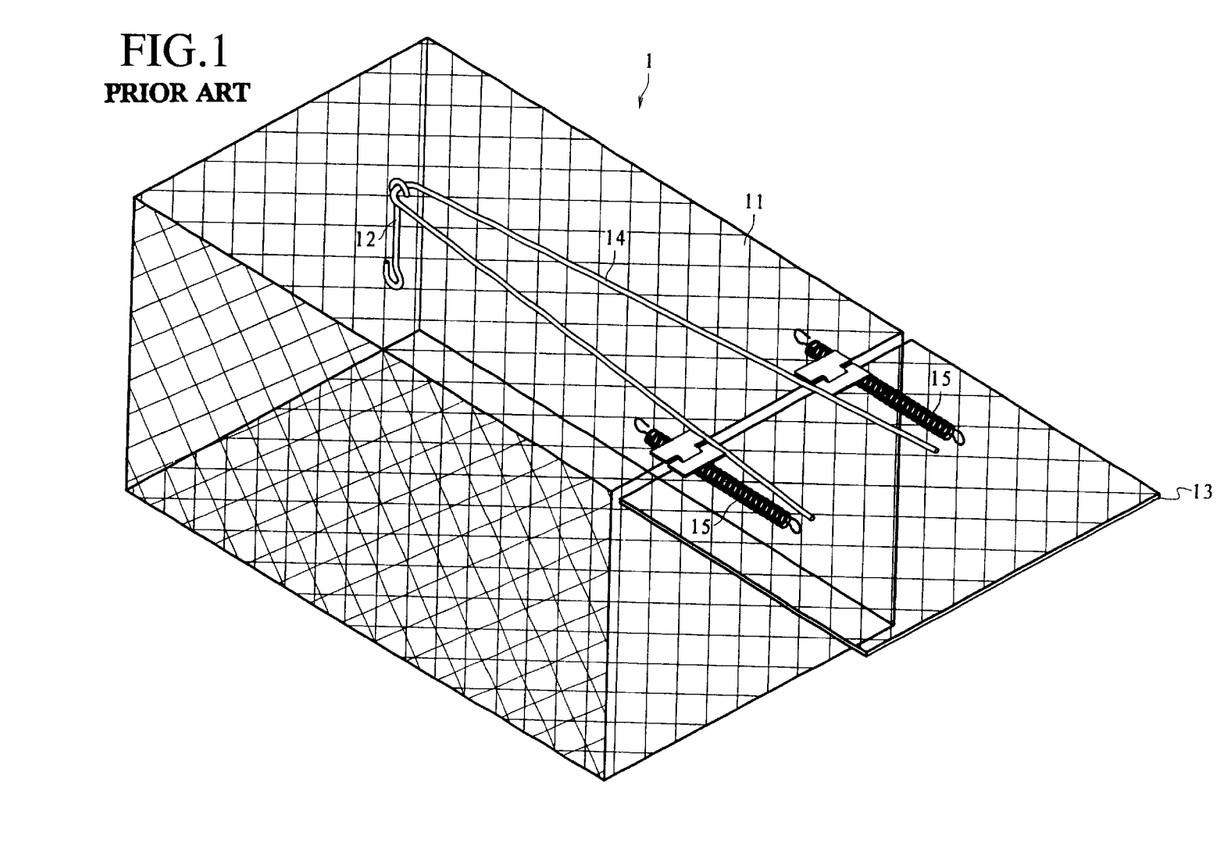
FIG. 1 shows a structural perspective view of the conventional gravitational animal trap.

The animal trap of the prior art, as shown in FIG. 1, mainly comprises a trap cage 11 and a hook 12; such trap cage 11 is of a cuboid cage, and such hook 12 is installed on the upper cover of the animal trap, with the lower part of the hook 12 able to hook bait. The upper edge of the outer frame on the front door 13 of the animal trap 11 is pivotally installed with the animal trap 11 and forms a pivoting portion, and the tightness of the front door 13 when shut is maintained by the pulling force of the elastic element 15. The front door 13 is installed with an activating handle 14, and the user can press the activating handle 14 to open the front door 13. As the front door 13 is fully opened, the activating handle 14 is to be closely attached to the top of the animal trap 11; at this time the bending portion on the upper end of the hook 12 that hooks bait is to hook and secure the activating handle 14, thus maintaining the equilibrium when the front door 13 is opened.

When the prey enters the animal trap 1, the front door 13 remains open; and yet when the prey begins to eat the bait hooked on the hook 12 or pull the bait on the hook 12, the hook 12 then releases the activating handle 14, and the front door 13, pulled by the elastic elements 15, is to be swiftly shut and remains tightly shut.

Nevertheless, the animal trap 1 of the prior art has the drawback in that, when the prey enters the trap cage, the front door 13 continues to remain open only until the bait lightens by being eaten a portion by the prey, a design that renders the prior art ineffective when the prey keeps alert and is capable of escaping from the animal trap after entering the animal cage. Therefore, the drawbacks of insensitive reaction and false timing render such design utterly ineffective.

SUMMARY OF THE INVENTION

The primary object is to provide a gravitational animal trap, comprising a trap cage with a movable door, and in the interior of such trap cage an upturned plate is installed, with a sensing device pivotally installed with the upturned plate to activate the door switch. When the prey enters the animal trap and steps on the upturned plate, causing the upturned plate to alter the state of equilibrium due to the gravitational force of the prey, the sensing device is activated to shut the movable door, thus achieving the object of entrapping the prey.

The gravitational animal trap of the present invention takes advantage of the gravitational force caused by the prey itself to activate the upturned plate and the sensing device, thus during the process of the prey's entering the animal trap, the door can be activated and shut, a design that achieves high sensitivity and timely reaction.

In the preferred embodiment of the present invention, a plurality of adjusting holes are installed on the side walls of the animal trap and on the two sides of the upturned plate, so that the user can adjust the positions and angles of the upturned plate to the optimal condition; also movable rings are installed between the sides walls of the trap cage and the upturned plate to avoid friction when the upturned plate moves up and down, thus the sensitivity of the upturned plate can be kept in the best mode.

BRIEF DESCRIPTION OF THE DRAWINGS

These and other features, aspects and advantages of the present invention will become better understood with regard to the following description, appended claims and accompanying drawings where:

THE DETAILED DESCRIPTION OF THE PREFERRED EMBODIMENTS

Figure 2:
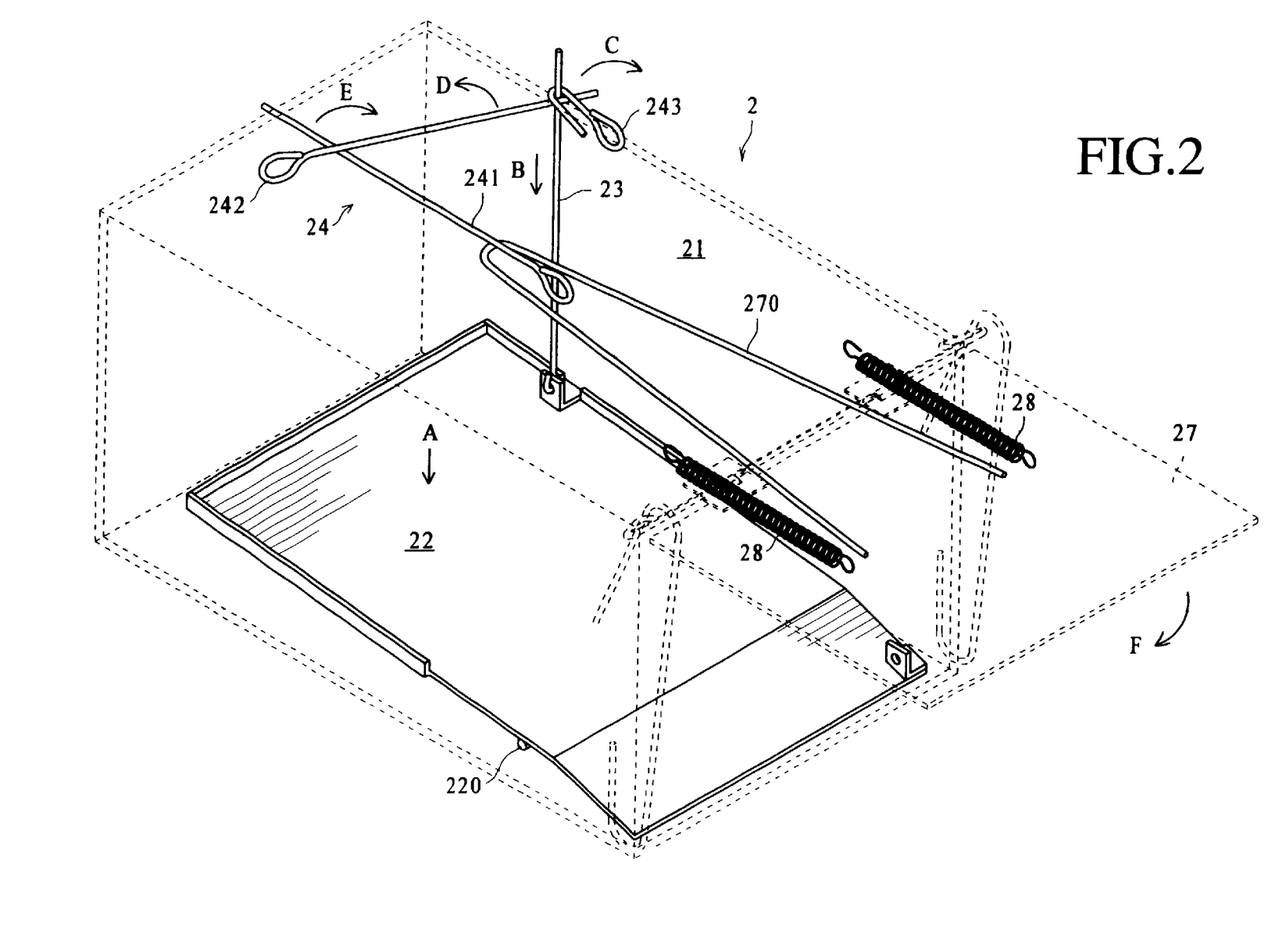
FIG. 2 shows the structural perspective view for the first embodiment of the gravitational animal trap of the present invention.

Please refer to FIG. 1 and FIG. 2 first, wherein are shown respectively the structural perspective view and the left side view for the first embodiment of the gravitational animal trap 2 of the present invention. The gravitational animal trap 2 comprises a trap cage 21 having a movable door 27, whereon the elastic elements 28 are installed to join the inner surface of the door 27 and the upper wall of the trap cage 21; the pulling force of the elastic element 28 pulls the door 27 inward to be closed, as well as keeping the door 27 tightly shut after being closed. An upturned plate 22, with a sensing device 23 pivotally installed on the rear side, is installed in the interior of the trap cage 21. A connecting mechanism is formed by a damping device 24 and the sensing device 23 to function as a holding device for the door 27 when opened; thus when the prey enters the animal trap 2, the gravitational force brought by the prey is to act upon the upturned plate 22 and causes the tilting angle of the upturned plate to be altered, a change that is to activate the sensing device 23, and further bringing the damping device 24 into action by releasing the door 27 being held previously and causes the door 27 to be shut.

Figure 3:
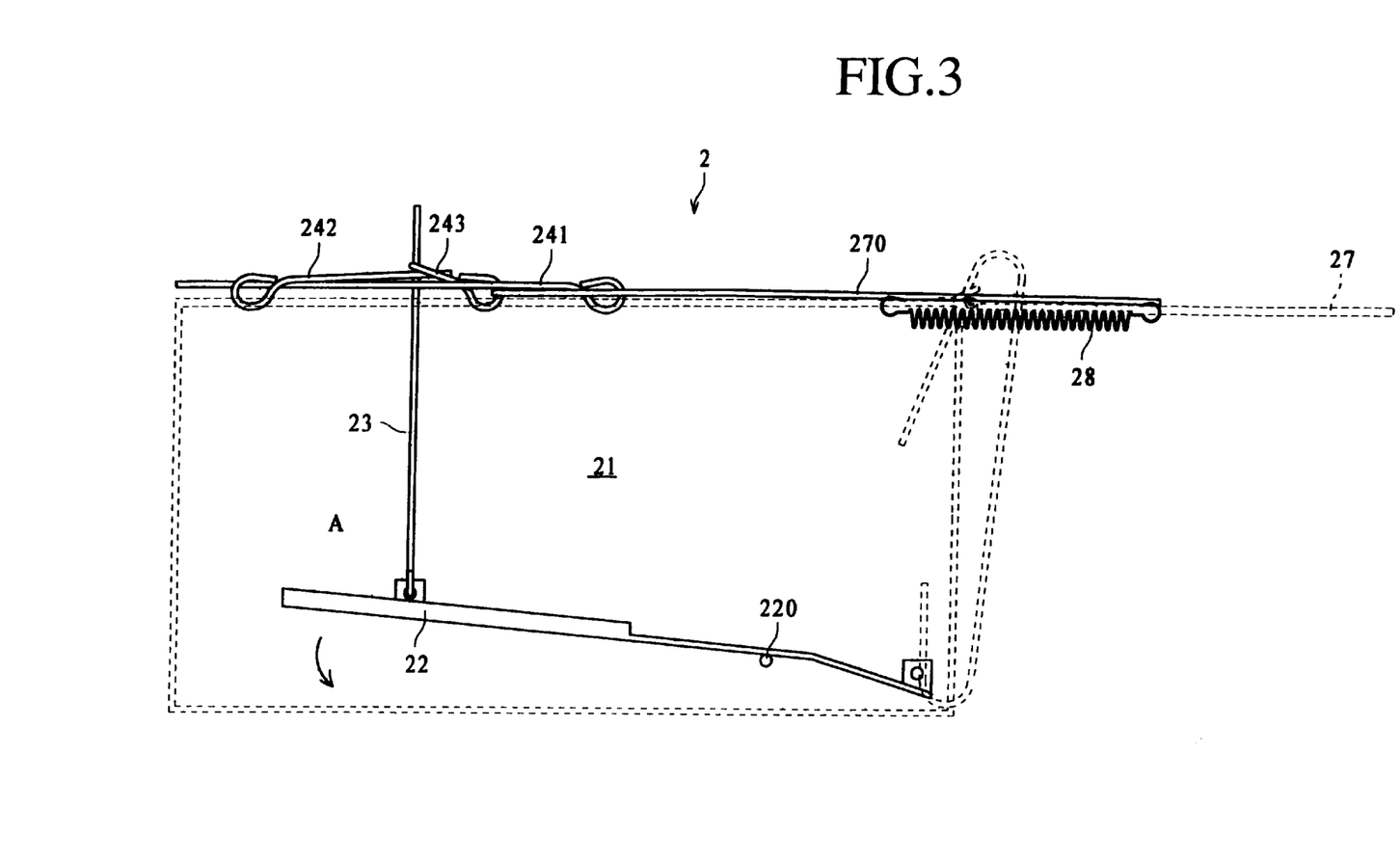
FIG. 3 shows the left side view for the first embodiment of the gravitational animal trap of the present invention.

Please continue refer to FIG. 3 in accordance with FIG. 2 regarding the first embodiment for the gravitational animal trap 2 of the present invention. The trap cage 21 is of a mesh-shaped cage; the lower end of the sensing device 23 is pivotally jointed with the upturned plate 22, and the upper end of the sensing device 23 stretches through the upper wall of the trap cage 21 and forms a free end. The damping device 24 comprises a first auxiliary lever 241, a second auxiliary lever 242 and a double-noose hook 243; both auxiliary levers 241 and 242 are of rod-shaped units, with the fixed ends being formed as hooks, which hook on the upper wall of the trap cage 21. The door 27 includes a handle 270, and the user can push the handle 270 to open the door 27; while the handle 270 is pushed to adhere near the outer surface of the upper wall of the trap cage 21, the first auxiliary lever 241 is to be rotated by using the hooking portion as fulcrum and is placed on top of the U-shaped portion of the handle 270. And then the second auxiliary lever 242 is to be rotated by using the hooking portion as fulcrum, and is placed on top of the first auxiliary lever 241. The double-noose hook 243 is pivotally jointed on the upper wall of the trap cage 21, with the two ends hooked on top of the upper wall of the trap cage 21 and thus forming a fulcrum; in addition, the double-noose hook 243 can be placed on top of the second auxiliary lever 242 and nooses onto the free end of the sensing device 23, so that, with the frictional force produced by the contact between the sensing device 23 and the double-noose hook 243, the first auxiliary lever 241, the second auxiliary lever 242 and the double noose hook 243 are to check with one another, thus forming an overall lever. As a result, the pulling force from the elastic elements 28 can keep the door 27 open through checking and buffering of the first auxiliary lever 241, the second auxiliary lever 242 and the double noose hook 243.

In the first embodiment of the present invention, various kinds of bait like corn or meat crumb can be spread on top of the upturned plate 22, so that when the prey enters the gravitational animal trap 2 and proceeds to go past the fulcrum 220 of the upturned plate 22, a movement that shall make the gravitational force of the prey act upon the upturned plate 22, forcing down the back end of the upturned plate 22 in direction of the arrow A, as shown in FIG. 3. At this time the equilibrium of the upturned plate 22 tilting forwards at the back end is altered, and is to rotate counterclockwise with the fulcrum 220 as pivot; please refer to the direction of the arrow A, as shown in FIG. 3. At the same time, as the back end of the upturned plate 22 is forced down, bringing also the sensing device 23 down, in direction as shown by arrow B in FIG. 2, the free end of the sensing device 23 is to be released from the noose of the double-noose hook 243, which, by losing the frictional force with the sensing device 23, is to be propped up by the second auxiliary lever 242 and rotated in direction of arrow C shown in FIG. 2. And then, by losing the pressing force from the double-noose hook 243, the second auxiliary lever 242 is to be propped up by the first auxiliary lever 241 to rotate in direction of the arrow D shown in FIG. 2, and the first auxiliary lever 241 is to rotate in direction of arrow E shown in FIG. 2; thus the pressure on the U-shaped portion of the handle 270 is to be released, and then the door 27 is to be pulled in direction of the arrow F in FIG. 2 and shut by the pulling force of the elastic elements 28.

Figure 4:
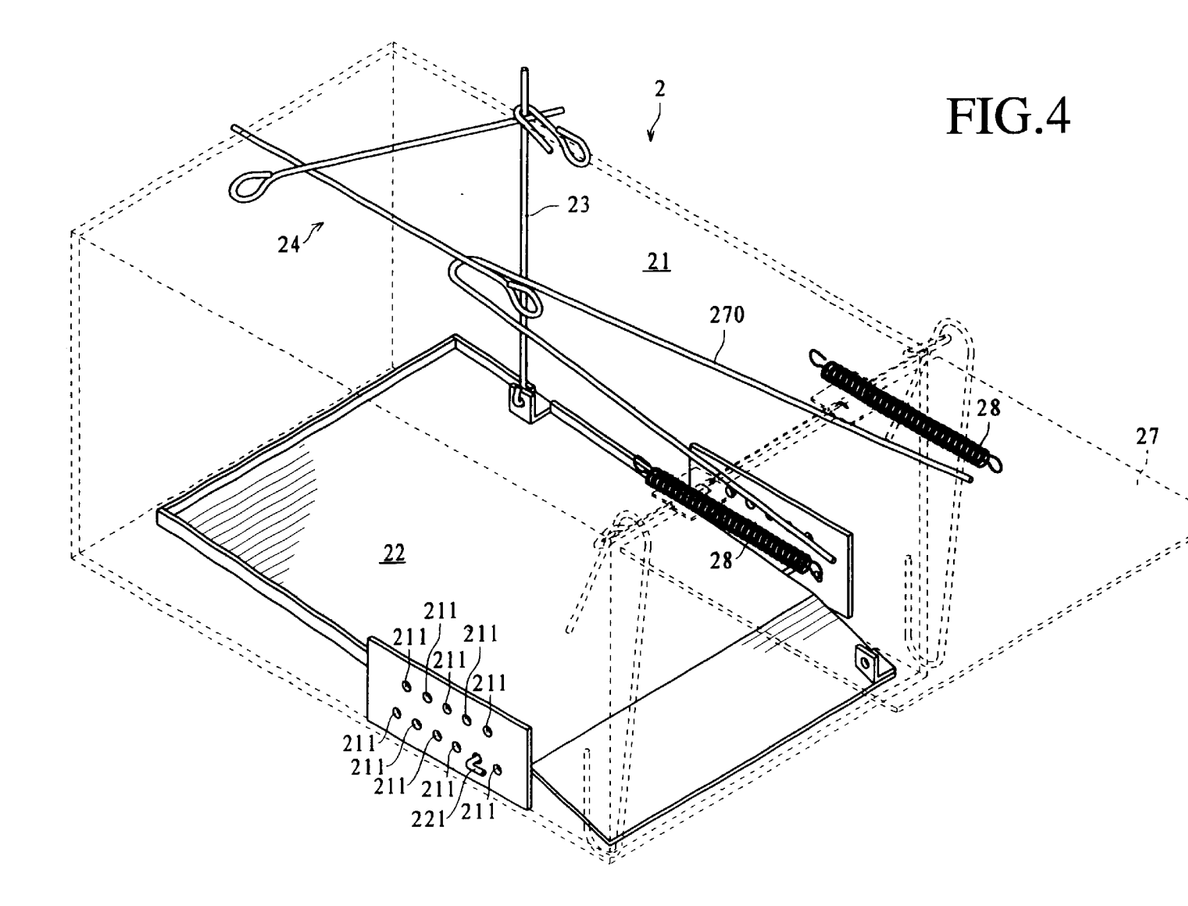
FIG. 4 shows the structural perspective view for the second embodiment of the gravitational animal trap of the present invention.
Figure 5:
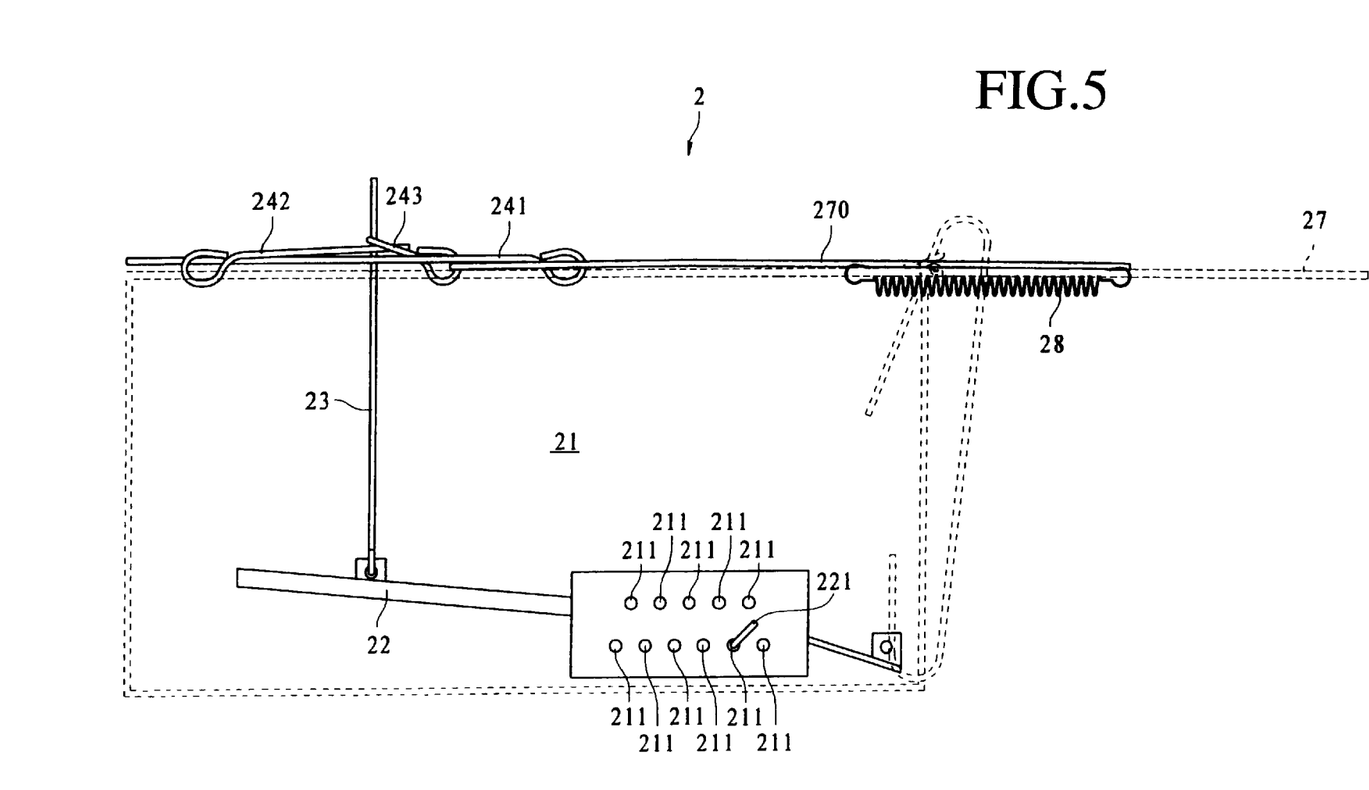
FIG. 5 shows the side view for the second embodiment of the gravitational animal trap of the present invention.

Please refer to FIG. 4 and FIG. 5, which respectively show the structural perspective view and the side view for the second embodiment of the gravitational animal trap 2 of the present invention, wherein a plurality of adjusting holes 211 are installed correspondingly on the left and right walls of the trap cage 21. The fulcrum 220 of the upturning plate 22 is of a supporting rod 221, which can be fixed between any symmetrical set of the adjusting holes 211, thus the upturning plate 22 is to make lever motion by using the supporting rod 221 as pivot. The supporting rod 221 can be adjusted to the desirable positions of the adjusting holes 211, depending on the sizes of the prey the user desires to capture; therefore the lengths of the leverage force of the upturning plate 22 on the two ends of the supporting rod 221 are to be altered to provide the upturning plate 22 with better sensitivity.

Figure 6:
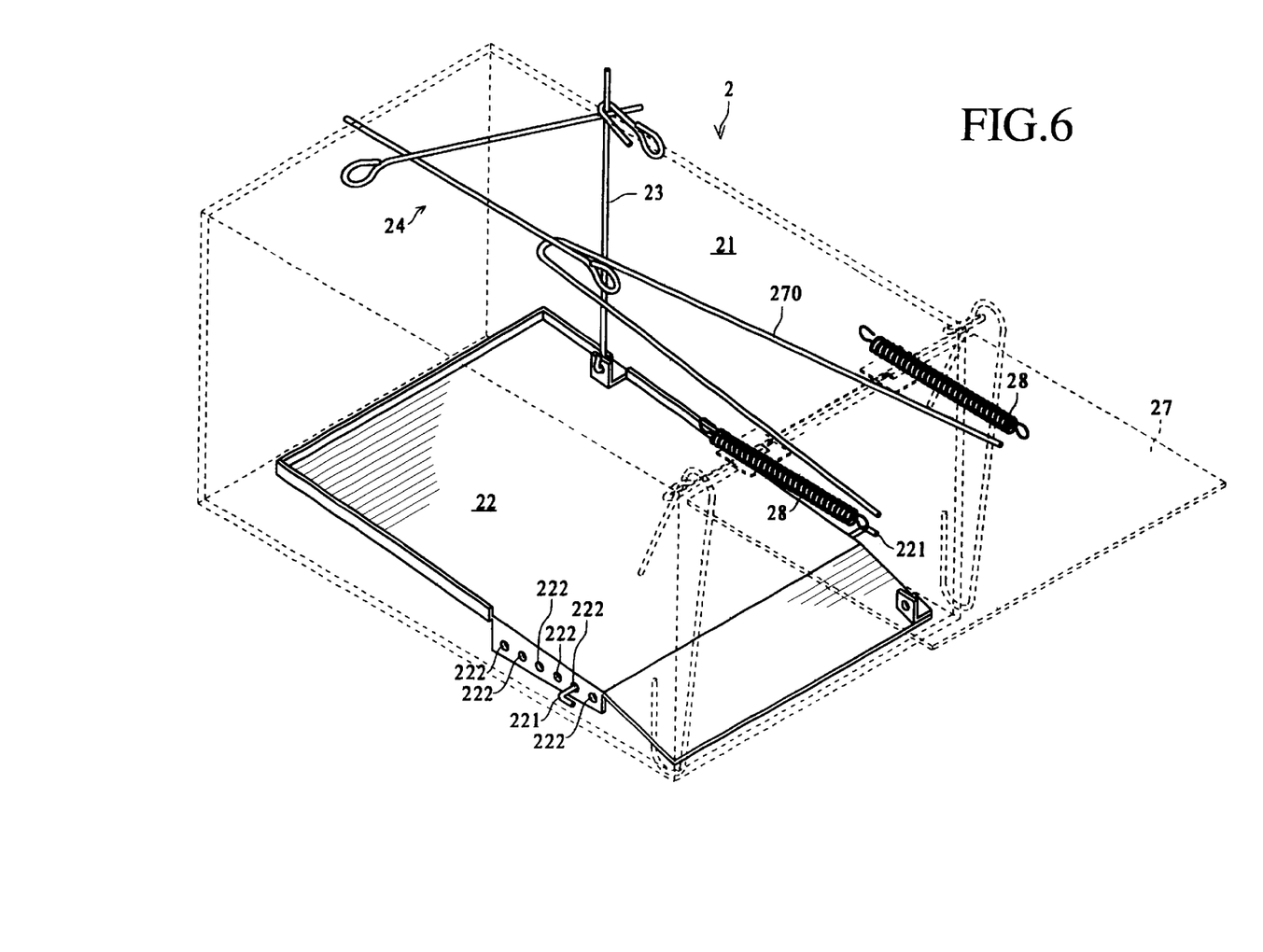
FIG. 6 shows the structural perspective view for the third embodiment of the gravitational animal trap of the present invention.
Figure 7:
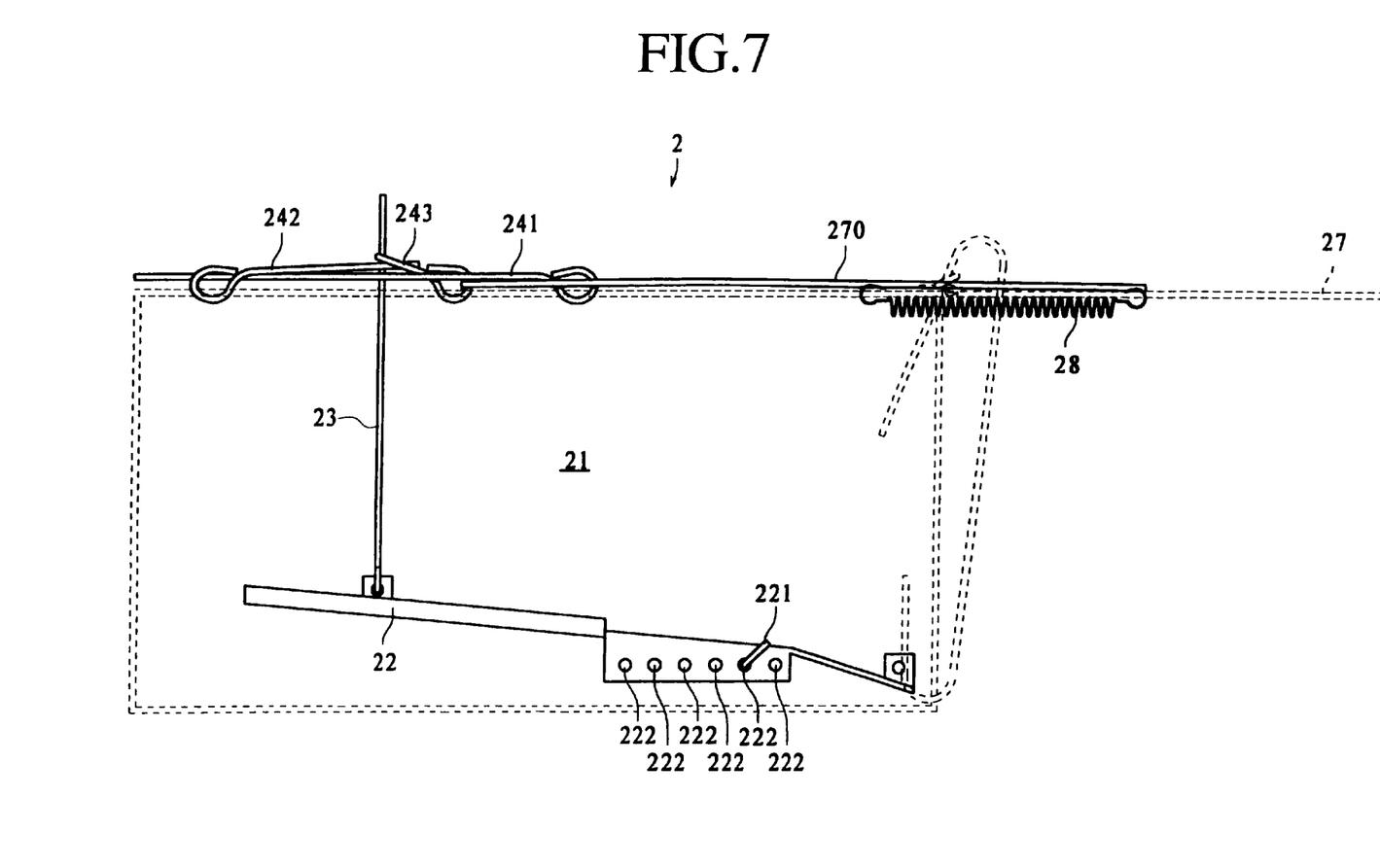
FIG. 7 shows the side view for the third embodiment of the gravitational animal trap of the present invention.

Please refer to FIG. 6 and FIG. 7, which respectively show the structural perspective view and the left side view for the third embodiment of the gravitational animal trap 2 of the present invention, wherein adjusting holes 211 are omitted. On the left and right sides of the upturning plate 22 adjusting holes 222 are also correspondingly installed, and the supporting rod 221, being the fulcrum of the upturning plate 22, can pierce through any set of the corresponding adjusting holes 222 installed on both sides of the upturning plate 22, and is further fixed at the left and right walls of the trap cage 2, thus the upturning plate 22 can make lever motion by using the supporting rod 221 as pivot. The supporting rod 221 can be adjusted to the desirable positions of the adjusting holes 222, depending on the sizes of the prey the user desires to capture; therefore the lengths of the leverage force of the upturning plate 22 on the two ends of the supporting rod 221 are to be altered to provide the upturning plate 22 with better sensitivity. This embodiment of the present invention can also be in accordance with the adjusting holes of the second embodiment of the present invention; by selecting the desirable set of the corresponding adjusting holes 211 and 222, the user can adjust the upturning plate 22 to the best condition of sensitivity.

Figure 8:
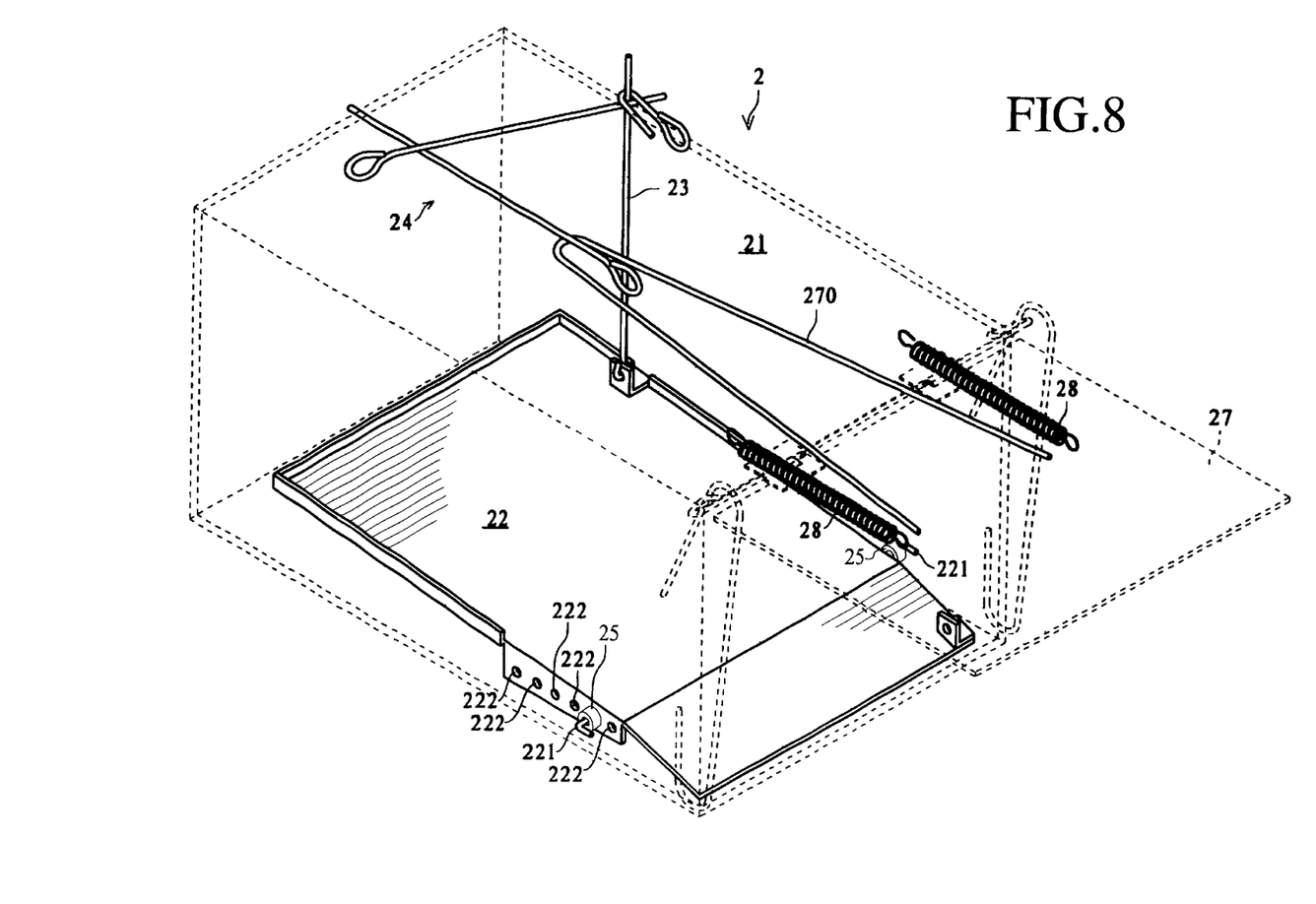
FIG. 8 shows the structural perspective view for the fourth embodiment of the gravitational animal trap of the present invention.

Please refer to FIG. 8, which respectively show the perspective view for the fourth embodiment of the gravitational animal trap 2 of the present invention, wherein FIG. 8 shows the view without the adjusting holes 211. Between the left and right side walls of the gravitational trap cage 21 and the upturned plate 22, two movable rings 25 are respectively installed to be pierced through by the supporting rod 221, thus forming the dividing device between the gravitational trap cage 21 and the upturned plate 22, so as to prevent friction and lowered sensitivity when the upturned plate 22 oscillates against the side walls of the gravitational trap cage 21.

Figure 9:
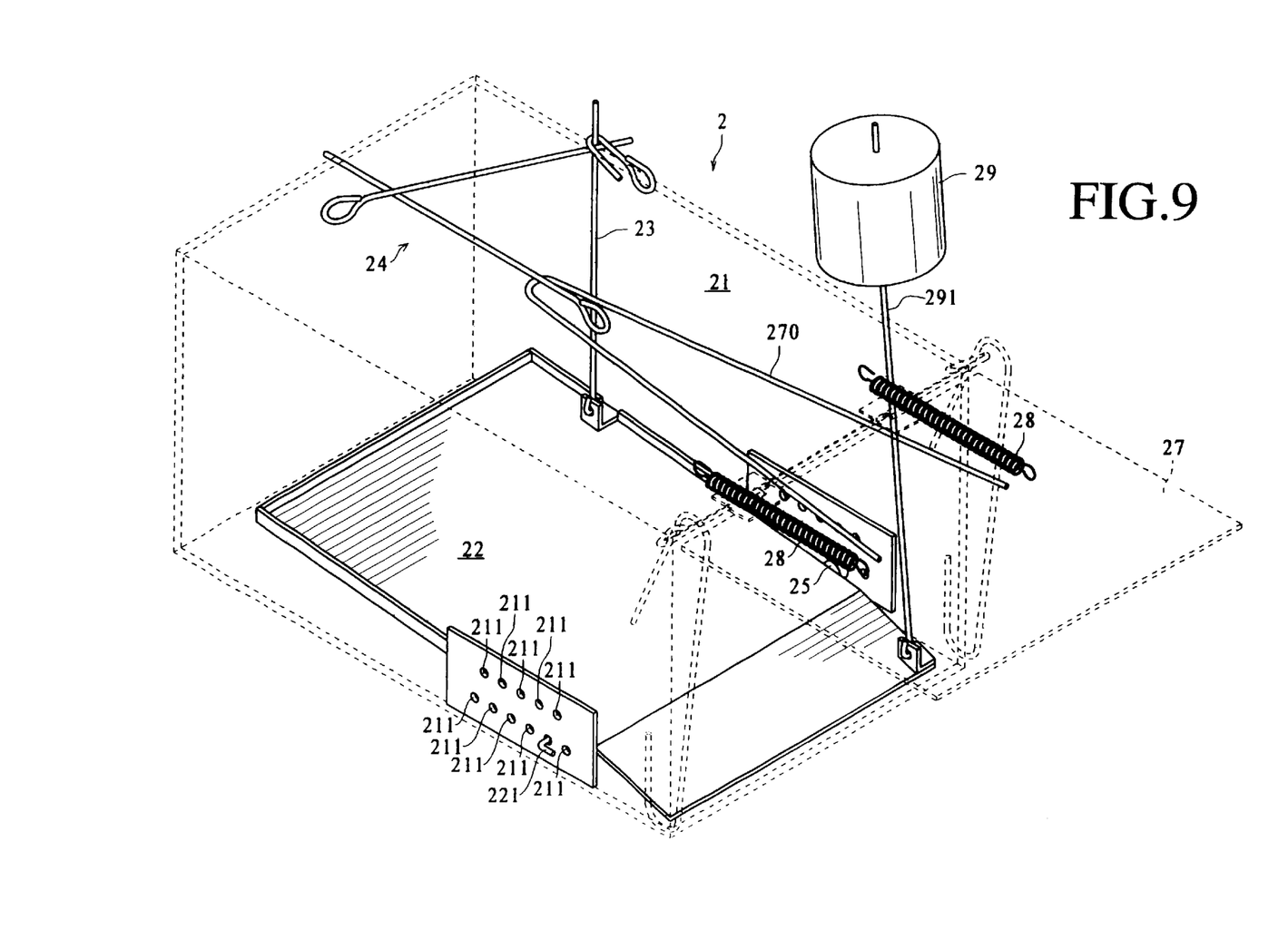
FIG. 9 shows the structural perspective view for the fifth embodiment of the gravitational animal trap of the present invention.
Figure 10:
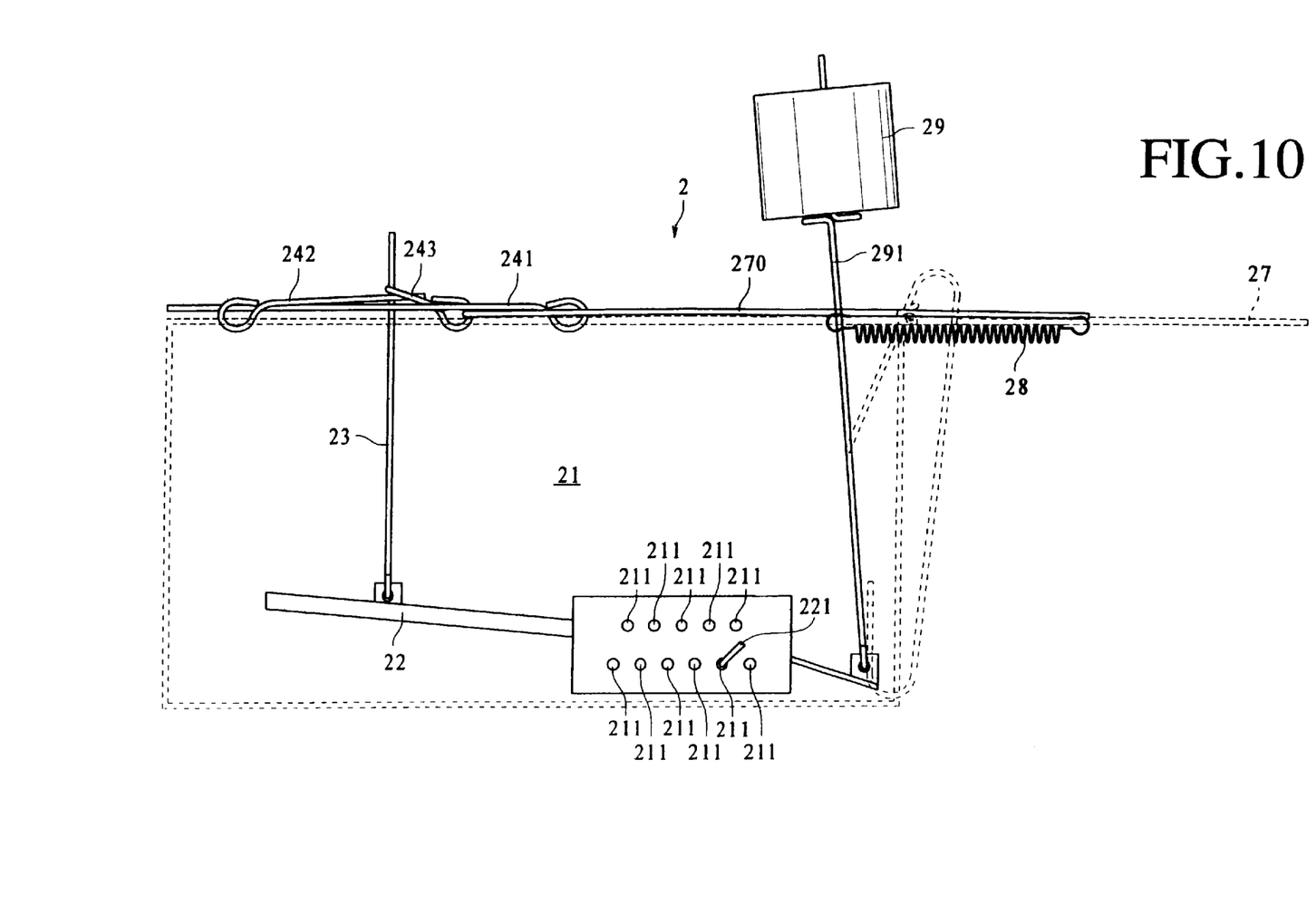
FIG. 10 shows the side view for the fifth embodiment of the gravitational animal trap of the present invention.

In one of the preferred embodiments of the present invention, a balancing device can be installed at the front end of the upturned plate 22, so as to keep the upturned plate 22, when not accepting any force, the position of tilting forward. Please refer to FIG. 9 and FIG. 10, which respectively show the structural perspective view and the side view for the fifth embodiment of the gravitational animal trap of the present invention; the balancing device includes a balancing weight 29 and a supporting pole 291. The supporting pole 291 pierces through the upper wall of the gravitational trap cage 21, with its lower end fixated at the front end of the upturning plate 22, and its upper end forming as a cross-like shape, thus the balancing weight 29 can be placed on top of the supporting pole 291; with the cross-like shape on top of the supporting pole 291 supporting the balancing weight 29, the upturned plate 22 can be kept, when not accepting any force, the position of tilting forward with its rear end being higher and its front end lower.

The upturning plate 22 of the gravitational animal trap 2 of the present invention can be further uplifted at the edges, so as to keep corns or meat crumbs used as bait from falling off the surface of the upturning plate 22.

Although the present invention has been described in considerable detail with reference to certain preferred embodiments thereof, those skilled in the art can easily understand that all kinds of alterations and changes can be made within the spirit and scope of the appended claims. Therefore, the spirit and scope of the appended claims should not be limited to the description of the preferred embodiments contained herein.

What is claimed is:

1. A gravitational animal trap comprising a door and an upturned plate installed in an interior of a trap cage, said upturned plate is further pivotally installed with a sensing device, a damping device used to hold said door open so that when a prey enters said animal trap, a degree of bias for said upturned plate changes by the force added thereon by the prey, and said damping device further releases the holding force on said door, thus said door is to be shut, preventing the prey from escaping; said damping device includes a first auxiliary lever, a second auxiliary lever and a double-noose hook with first and second ends; said first auxiliary lever and said second auxiliary lever are both rod-shaped levers, each with a free end and a fixed end being formed as a hooking portion, each of which hooks on an upper wall of said trap cage, said door comprising a handle, which can be pushed to open said door, and then said handle can be pushed so that it is positioned adjacent an outer surface of said upper wall of said trap cage, at this time, said first auxiliary lever can be rotated by using said hooking portion thereof as a fulcrum and is placed on top of a U-shaped portion of said handle; said double-noose hook is pivotally joined via said first end thereof to said upper wall of said trap cage, with the second end hooked on top of said upper wall of said trap cage and thus forming a fulcrum, also said double-noose hook is placeable on top of said second auxiliary lever when said second end of said double-noose hook nooses onto a free end of said sensing device so that due to the frictional force produced by the contact between said sensing device and said double-noose hook, said first auxiliary lever, said second auxiliary lever and said double-noose hook form an overall lever device; and pulling force from elastic elements joining an inner surface of the door and the upper wall of the trap cage can keep said door open through mutual checking of said first auxiliary lever, said second auxiliary lever and said double-noose hook and said sensing device.

* * * * *